Figure 1:
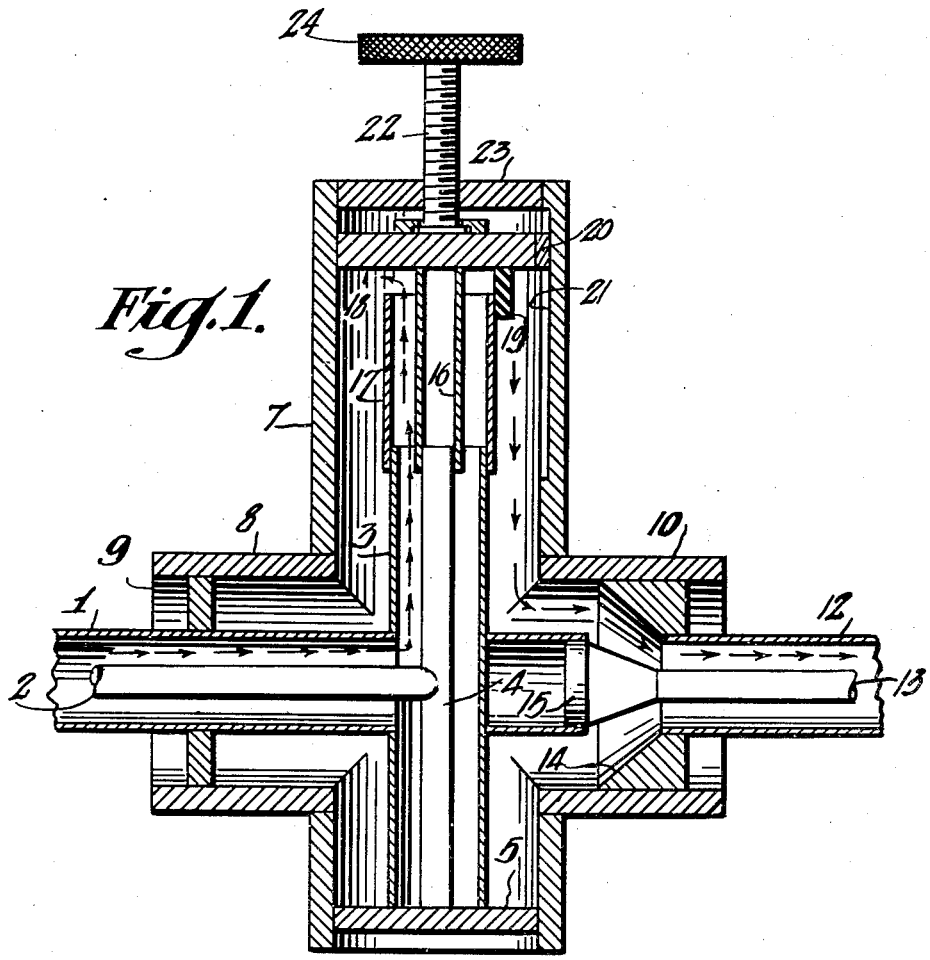

March 4, 1947.                 D. R. CROSBY                 2,416,981
RADIO FREQUENCY TRANSMISSION LINE
Filed March 29, 1943            2 Sheets-Sheet 1

Inventor
David R. Crosby
BY C. D. Tuska
Attorney

March 4, 1947.　　　D. R. CROSBY　　　2,416,981
RADIO FREQUENCY TRANSMISSION LINE
Filed March 29, 1943　　　2 Sheets-Sheet 2

Inventor
David R. Crosby
By
C D Tuska
Attorney

Patented Mar. 4, 1947

2,416,981

UNITED STATES PATENT OFFICE 2,416,981

RADIO FREQUENCY TRANSMISSION LINE

David R. Crosby, Haddonfield, N. J., assignor to Radio Corporation of America, a corporation of Delaware Application March 29, 1943, Serial No. 481,053

13 Claims. (Cl. 178—44)

This invention relates generally to radio frequency power transmission lines and particularly to a device for adjusting the length of a concentric transmission line for radio frequency currents.

The conventional method of adjusting the length of concentric transmission lines is to insert a "trombone" section of concentric line at a desired point in the concentric transmission line. A "trombone" consists of a U-shaped section of concentric line which is arranged to telescope with two parallel sections of the main transmission line whereby the effective length of the main transmission line may be adjusted to any desired value. One of the principal disadvantages of the trombone line is the mechanical difficulty in providing a smoothly operating device wherein the trombone movable section telescopes readily and with substantially constant contact resistance into the parallel sections of the main transmission line. Another difficulty is in providing suitable control means for adjusting the position of the trombone when the line is tuned. Also, the conventional "trombone" employs two transmission line elbows to connect between a straight section of the transmission line and the "trombone." These elbows are eliminated in the present invention.

Two common applications of variable length transmission lines are: first, to provide a phase shift in a terminated line; and second, in combination with a shorting stub, to match a line having an appreciable standing wave ratio. For a coaxial line, perhaps the most common type of line matcher is the "two stub tuner" consisting of two shorting stubs connected to the line at a fixed distance apart, the lengths of the two stubs being variable.

The instant invention comprises an improved device adapted to replace the conventional trombone wherein a single adjusting member such as, for example, a threaded rod, may be operated to control efficiently the effective length of the transmission line. Additional means may be included to vary the attenuation provided by the device, as well as to control the tuning of the input and output lines which are connected to the device. The invention is particularly adapted to economical and efficient commercial design and requires considerably less space than the conventional trombone type device.

Briefly, the improved device comprises a section of concentric line to which the input line is connected at a convenient point. The section of concentric line should have similar surge impedance to that of the input line. The concentric line section is surrounded by a cylindrical chamber which forms a third transmission line with the outer conductor of the first transmission line section. A shorting plug for the third transmission line chamber is adjustably disposed within one end of the cavity. This plug carries a telescopic section of concentric transmission line which is arranged to telescope with both conductors of the first transmission line section. The outer conductor of the telescopic transmission line section is insulated from the shorting plug while the inner conductor of the telescopic section is connected to the shorting plug. The third transmission line is coupled through an impedance matching device of conventional design to an output concentric transmission line connection means. It should be understood that the output and input transmission lines are so designated only for the purpose of illustration, since the device may be used readily for transmission of power in either direction.

If desired, conventional quarter wave stubs may be employed to support the chamber on the input, output or inner transmission line outer conductors. Such quarter wave stubs provide suitable mechanical rigidity while presenting an effectively infinite impedance to currents circulating within the conductors of the device.

Among the objects of the invention are to provide an improved device for adjusting the length of a high frequency concentric transmission line. Another object of the invention is to provide an improved method of and means for adjusting the effective length of a high frequency concentric line and simultaneously providing means for tuning the input and output lines connected to said device. Another object of the invention is to provide an improved means for adjusting the length of a high frequency concentric transmission line wherein the line length adjusting means are disposed coaxially with a single concentric line section of the device. Still another object of the invention is to provide an improved means for adjusting the effective length of a high frequency concentric transmission line which includes a selectively tuned band-pass filter device including means for matching the surge impedances of the input and output lines connected to said device.

Figure 2:
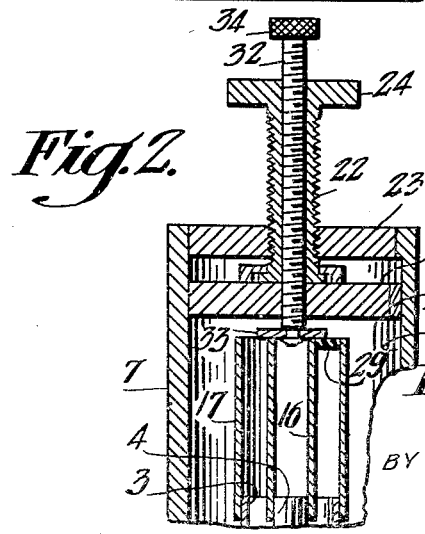
Figure 3:
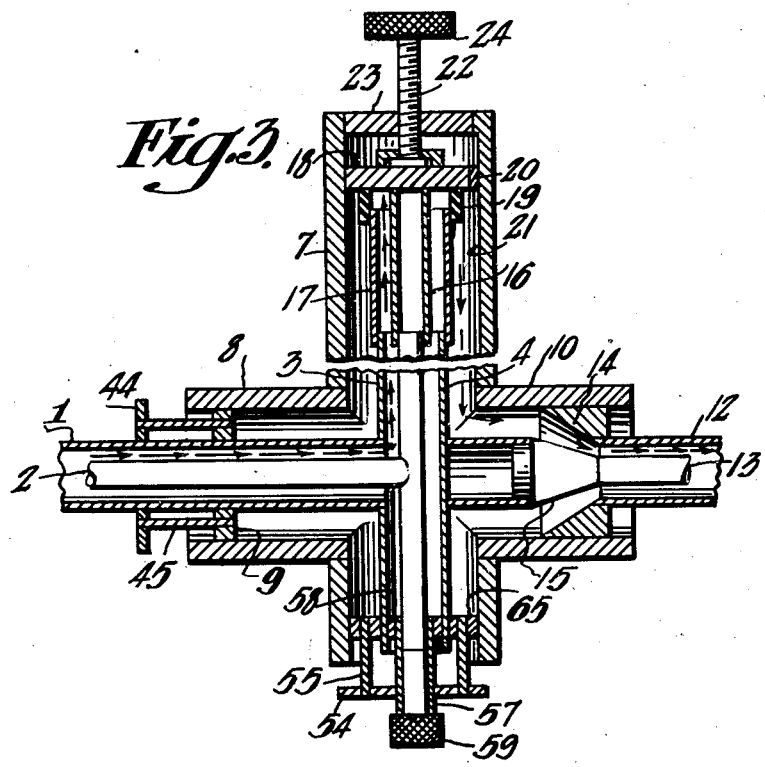
Figure 4:
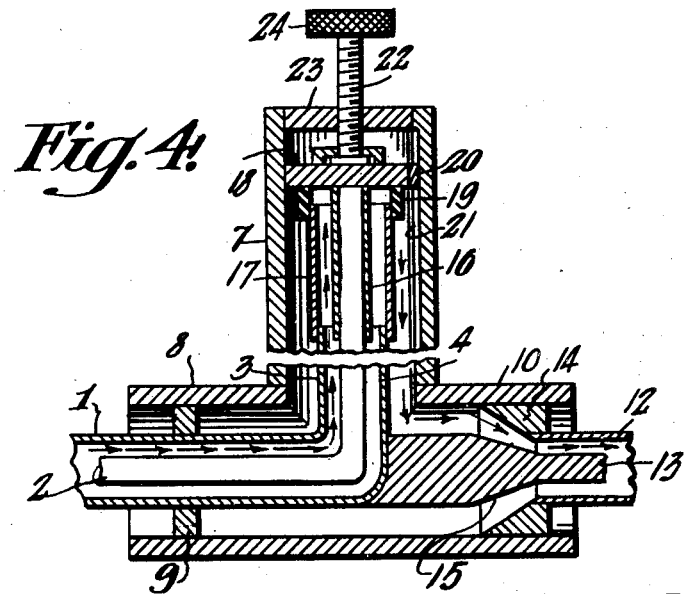

The invention will be more clearly understood by reference to the accompanying drawings of which Figure 1 is a cross-sectional view of one embodiment of the device; Figure 2 is a fragmentary cross-sectional view of a modification of the device of Figure 1; Figure 3 is a cross-sectional view of a second embodiment of the invention and Figure 4 is a cross-sectional view of a third embodiment of the invention. Similar reference numerals are applied to similar elements throughout the drawings.

Referring to Figure 1, a first concentric transmission line includes an outer conductor 1 and an inner conductor 2. Both conductors of the first transmission line terminate at suitable points on a second transmission line which includes an outer conductor 3 and an inner conductor 4. From the standpoint of efficiency, one end of the second transmission line should preferably be short circuited by a shorting plug 5 at a point approximately one quarter wave length at the operating frequency from the junction of the inner conductors 2 and 4 of the first and second concentric lines.

An outer cylindrical shell 7 is disposed concentrically with the outer conductor 3 of the second transmission line and forms therewith a third transmission line comprising the conductors 7 and 3. To obtain constant surge impedance throughout the device, the outer diameters of the inner conductors should bear a constant ratio to the inner diameters of the outer conductors in each of the three concentric transmission lines already mentioned.

The outer cylindrical shell 7 may be supported conveniently by the outer conductor 1 of the first transmission line by means of a cylindrical conductive element 8 and a conductive plug 9. The inner diameter of the cylindrical member 8 may bear the same ratio to the outer diameter of the first outer conductor 1 as the inner diameter of the first conductor 1 bears to the outer diameter of the inner conductor 2 of the first transmission line, although such relation is not essential since this portion of the device carries negligible power. The inner surface of the plug 9 should be located substantially a quarter wave length at the operating frequency from the junction of the inner conductors 2 and 4 of the first and second transmission lines to provide the conventional type of quarter wave reflector.

A second cylindrical shell 10 may be utilized to support, by means of a tapered plug 14, the outer shell 7 on an output concentric transmission line which includes an outer conductor 12 and an inner conductor 13. The third transmission line, comprising the conductors 7 and 3, may be matched to the output transmission line, comprising the conductors 12 and 13, respectively, by means of a tapered line section comprising the outer conductive plug portion 14 and an inner conductive portion 15. The chamber 7 may preferably be extended to envelope completely the second line 3, 4. The extended chamber may be terminated by the shorting plug 5.

A fourth transmission line comprising a hollow inner conductor 16 and a concentrically disposed outer conductor 17 is disposed to telescope respectively with the inner conductor 4 and the outer conductor 3 of the second transmission line. The inner hollow conductor 16 of the fourth transmission line section terminates in a shorting plug 18 which is arranged to move axially within the outer shell 7 of the third transmission line. The outer shell 17 of the fourth transmission line is rigidly mounted on the shorting plug 18 by means of a suitable insulated support 19. The insulating support may be in the form of a ring or a plurality of blocks or strips of insulating material. The shorting plug 18 may be keyed suitably in the outer shell 7 by means of a key 20 and a keyway 21. The position of the shorting plug 18 within the outer shell 7 and the effective length of the second and third transmission lines may be varied simultaneously by means of an adjusting screw 22 which passes through a threaded hole in a terminating plug 23 located in the end of the outer shell 7. A suitable control knob 24 may be provided for the adjusting screw 22. It will be seen that adjustment of the control knob 24 will vary simultaneously the position of the shorting plug 18 and the effective length of the fourth transmission line, which in turn varies simultaneously the effective lengths of both the second and third lines by an overall amount equal to twice the travel of the shorting plug 18. Coupling between the third and fourth concentric transmission lines will be determined by the aperture between the shorting plug 18 and the end of the outer conductor 17 of the fourth transmission line. In the embodiment described, this coupling is maintained at a constant value. The arrows indicate the energy transfer path through the device.

A modification of the device of Fig. 1 permits the elimination of the insulator 19 between the shorting plug 18 and the end of the outer conductor 17 of the fourth line. The outer conductor 17 of the fourth line may be extended through the lower shorting plug 5 and thereby externally adjusted. If desired, the inner conductor 16 may be similarly extended and linked externally to the outer conductor 17 for dual control thereof.

Figure 2 is a fragmentary view of the upper portion of a device of the general type described in Figure 1, with the exception that provision is made for varying the coupling between the third and fourth concentric transmission lines by varying the gap formed between the shorting plug 18 and the end of the outer conductor 17 of the fourth transmission line. This adjustment is provided by a second adjusting screw 32 which is threaded coaxially through the center of the first adjusting screw 22 and is terminated in a flat conducting element 33 which supports the inner conductor 16 of the fourth concentric transmission line. The outer conductor 17 of the fourth transmission line is supported rigidly with respect to the inner conductor 16 thereof by means of an insulating member 29 of any suitable design. A second adjusting knob 34 is connected to the second adjusting screw 32. This modification provides separate control of the adjustments of the shorting plug 18 and the position with respect thereto of the fourth transmission line comprising the conductor 16, 17. Differential adjustments of the first and second control knobs 24, 34, respectively, will provide control of the coupling between the third and fourth transmission lines as well as vary the effective lengths of the second and third lines, of a device as otherwise described in Fig. 1.

Figure 3 is similar to Figure 1 with the exception that the shorting plug 9 may be adjusted axially with respect to the first transmission line comprising the outer conductor 1 and the inner conductor 2. A third adjusting knob 44 in the form of a ring surrounding the outer conductor 1 of the first transmission line is connected to the movable plug 9 by means of a second ring member 45 which is concentric with the outer conductor 1 of the first transmission line. The position of the movable plug 9 may therefore be adjusted to one quarter wave length at any selected transmission frequency.

A similar arrangement, comprising a fourth adjusting knob 54, ring member 55 and adjustable shorting plug 65 may also be utilized to tune the lower cavity between the outer shell 7 and the outer conductor 3 of the second transmission line to a length substantially one quarter wave length at the operating frequency from the junction of the inner conductors of the first and second transmission lines. Adjustment of the shorting plug 65 also will provide a tuning control for the output concentric transmission line comprising the outer conductor 12 and the inner conductor 13.

Similarly, a tuning control for the input transmission line comprising the outer conductor 1 and the inner conductor 2 may be provided by a coaxially disposed hollow control shaft 57 which passes through the center of the fourth control knob 54 and telescopes with the outer surface of the inner conductor 4 of the second transmission lines. The hollow shaft 57 terminates in a fifth shorting plug 58 which may be adjusted axially within the second transmission line to tune the input line. A fifth control knob 59 may be connected to the outer end of the hollow control shaft for this purpose.

The modification illustrated in Figure 4 is similar to that described in Figure 1 with the exception that the quarter wave lower sections of the second and third transmission lines, comprising the outer shell 7 and the outer conductor 3 and inner conductor 4 of the second transmission line, are omitted. The modified construction of Figure 4 has the disadvantage of reduced rigidity but may be desirable where space is an important factor. Also, no provision is included in this modification for tuning separately the input and output transmission lines as in the device described in Figure 3. However, the modification described in Figure 2 may be incorporated readily in the embodiments illustrated and described in Figures 3 and 4. It should be understood that, for example, a combination of the device described in Fig. 3 and the modification described in Fig. 2 will provide a device which may be tuned to have band-pass filter characteristics, since separate line tuning and coupling controls are provided in addition to control of effective line length.

Thus the invention described comprises several embodiments and modifications thereof of a device for adjusting the length of a conventional concentric transmission line, including means for tuning the input and output concentric lines connected to said device.

I claim as my invention:

1. An adjustable high frequency transmission line device which includes a first concentric transmission line, a second concentric line angularly disposed with respect to said first line, a connection from one end of said first line to a predetermined point on said second line, a chamber concentric with said second line forming a third concentric line with the outer conductor of said second line, means coupling together said second and said third lines, a fourth concentric line, means coupling said chamber to said fourth line, and means for adjusting the lengths of said second and said third concentric lines.

2. An adjustable high frequency transmission line device which includes a first concentric transmission line, a second concentric line angularly disposed with respect to said first line, a connection from one end of said first line to a predetermined point on said second line, a chamber concentric with said second line forming a third concentric line with the outer conductor of said second line, means coupling together said second and said third lines, a fourth concentric line, means including an impedance matching device coupling said chamber to said fourth line, and means for adjusting simultaneously the lengths of said second and said third concentric lines.

3. An adjustable high frequency transmission line device which includes a first concentric transmission line, a second concentric line disposed normal to said first line, a connection from one end of said first line to a predetermined point on said second line, a chamber concentric with said second line forming a third concentric line with the outer conductor of said second line, means coupling together said second and said third lines, a fourth concentric line coaxial with said first line, means coupling said chamber to said fourth line, and means for adjusting simultaneously the lengths of said second and said third concentric lines.

4. An adjustable high frequency transmission line device which includes a first concentric transmission line, a second concentric line disposed normal to said first line, a connection from one end of said first line to a predetermined point on said second line, a chamber concentric with said second line forming a third concentric line with the outer conductor of said second line, means coupling together said second and said third lines, a fourth concentric line, means coupling said chamber to said fourth line, and means including a fifth concentric line arranged to telescope with said second line and a plug coaxially adjustable with said third line for adjusting simultaneously the lengths of said second and said third concentric lines.

5. An adjustable high frequency transmission line device which includes a first concentric transmission line, a second concentric line disposed normal to said first line, a connection from one end of said first line to a predetermined point on said second line, a chamber concentric with said second line forming a third concentric line with the outer conductor of said second line, means coupling together said second and said third lines, a fourth concentric line coaxial with said first line, means including an impedance matching device coupling said chamber to said fourth line, and means including a fifth concentric line arranged to telescope with said second line and a plug coaxially adjustable with said third line for adjusting simultaneously the lengths of said second and said third concentric lines.

6. Apparatus of the type described in claim 4 including means disposed externally of said third line for controlling said adjusting means.

7. An adjustable high frequency transmission line device which includes a first concentric transmission line, a second concentric line, a connection from one end of said first line to a predetermined point on said second line, a resonant chamber concentric with said second line forming a third concentric line with the outer conductor of said second line, adjustable means coupling together said second and said third lines, a fourth concentric line, means coupling said resonant chamber to said fourth line, and means for adjusting simultaneously the lengths of said second and said third concentric lines.

8. An adjustable high frequency transmission line matching device which includes a first concentric transmission line, a second concentric line disposed normal to said first line, a connection from one end of said first line to a predetermined point on said second line, a chamber concentric with said second line forming a third concentric line with the outer conductor of said second line, adjustable means coupling together said second and said third lines, a fourth concentric line coaxial with said first line, means including an impedance matching device coupling said chamber to said fourth line, and means including a fifth concentric line arranged to telescope with said second line and a plug coaxially adjustable with said third line for adjusting simultaneously the lengths of said second and said third concentric lines.

9. Apparatus of the type described in claim 1 including a quarter wave reflector cylindrical conducting member disposed normally with respect to said chamber and coaxial with said first concentric line for supporting said chamber on said first line.

10. Apparatus of the type described in claim 1 including an adjustable quarter wave reflector cylindrical conducting member disposed normally with respect to said chamber and coaxial with said first concentric line for supporting said cavity on said first line.

11. Apparatus of the type described in claim 5 including separate means coaxial with said second and said third concentric lines for tuning selectively said first and said fourth concentric lines, respectively.

12. Apparatus of the type described in claim 5 including separately adjustable means coaxial with said second and said third concentric lines for tuning selectively said first and said fourth concentric lines, respectively.

13. An adjustable length high frequency transmission line device which includes a first concentric transmission line, a second concentric line, a connection from one end of said first line to a predetermined point on said second line, a cylindrical conducting element concentric with said second line forming a third concentric line with the outer conductor of said second line, a fourth concentric line, said first and said fourth concentric line, supporting said second and third lines, means coupling said third line to said fourth line, and coaxial means for adjusting the effective lengths of said second and said third concentric lines.

DAVID R. CROSBY.

REFERENCES CITED

The following references are of record in the file of this patent:

UNITED STATES PATENTS

| Number | Name | Date |
|---|---|---|
| 2,109,843 | Kassner | Mar. 1, 1938 |